United States Patent
Zubeck et al.

(10) Patent No.: US 7,971,567 B2
(45) Date of Patent: Jul. 5, 2011

(54) DIRECTLY INJECTED INTERNAL COMBUSTION ENGINE SYSTEM

(75) Inventors: Michael W. Zubeck, LaSalle, MI (US); George Carver Davis, Ypsilanti, MI (US); Eric Warren Curtis, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 895 days.

(21) Appl. No.: 11/871,496

(22) Filed: Oct. 12, 2007

(65) Prior Publication Data

US 2009/0095546 A1  Apr. 16, 2009

(51) Int. Cl.
*B60K 8/00* (2006.01)
*F02B 17/00* (2006.01)
*F02M 43/00* (2006.01)

(52) U.S. Cl. ............................................ 123/304
(58) Field of Classification Search ............. 123/304, 123/305, 295, 525, 585; 701/103–105
See application file for complete search history.

(56) References Cited

U.S. PATENT DOCUMENTS

| | | | |
|---|---|---|---|
| 2,221,405 A | 11/1940 | Nallinger |
| 3,589,348 A | 6/1971 | Reichhelm |
| 3,794,000 A | 2/1974 | Hodgkinson |
| 4,031,864 A | 6/1977 | Crothers |
| 4,136,652 A | 1/1979 | Lee |
| 4,205,650 A | 6/1980 | Szwarcbier |
| 4,256,075 A | 3/1981 | Fukui et al. |
| 4,311,118 A | 1/1982 | Slagle |
| 4,325,329 A | 4/1982 | Taylor |
| 4,331,121 A | 5/1982 | Stokes |
| 4,402,296 A | 9/1983 | Schwarz |
| 4,411,243 A | 10/1983 | Hardenberg et al. |
| 4,459,930 A | 7/1984 | Flory |
| 4,480,616 A | 11/1984 | Takeda |
| 4,489,596 A | 12/1984 | Linder et al. |
| 4,502,453 A | 3/1985 | Kabasin et al. |
| 4,590,904 A | 5/1986 | Wannenwetsch |
| 4,648,367 A | 3/1987 | Gillbrand et al. |
| 4,706,630 A | 11/1987 | Wineland et al. |
| 4,810,929 A | 3/1989 | Strumbos |

(Continued)

FOREIGN PATENT DOCUMENTS

EP     1057988     1/2006

(Continued)

OTHER PUBLICATIONS

Unknown Author, "Honda Making Significant Progress on HCCI Engine for Hybrid Application," http://www.greencarcongress.com/2005/10/honda_making_si.html, Oct. 28, 2005, 8 pages.

(Continued)

*Primary Examiner* — Hieu T Vo

(74) *Attorney, Agent, or Firm* — Allan J. Lippa; Alleman Hall McCoy Russell & Tuttle LLP

(57) ABSTRACT

An engine system for a vehicle, comprising of a combustion chamber, a first in-cylinder direct injector configured to deliver a first substance including at least gasoline directly to the combustion chamber at a first pressure; and a second in-cylinder direct injector configured to deliver a second substance including at least an alcohol directly to the combustion chamber at a second pressure less than the first pressure.

20 Claims, 11 Drawing Sheets

U.S. PATENT DOCUMENTS

| | | | |
|---|---|---|---|
| 4,817,576 A | 4/1989 | Abe et al. | |
| 4,930,537 A | 6/1990 | Farmer | |
| 4,945,881 A | 8/1990 | Gonze et al. | |
| 4,962,789 A | 10/1990 | Benscoter | |
| 4,993,386 A | 2/1991 | Ozasa et al. | |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,056,490 A | 10/1991 | Kashima | |
| 5,056,494 A | 10/1991 | Kayanuma | |
| 5,060,610 A | 10/1991 | Paro | |
| 5,111,795 A | 5/1992 | Thompson | |
| 5,131,228 A | 7/1992 | Mochizuki et al. | |
| 5,188,087 A | 2/1993 | Saito | |
| 5,204,630 A | 4/1993 | Seitz et al. | |
| 5,230,309 A | 7/1993 | Suga et al. | |
| 5,233,944 A | 8/1993 | Mochizuki | |
| 5,335,637 A | 8/1994 | Davis et al. | |
| 5,336,396 A | 8/1994 | Shetley | |
| 5,357,908 A | 10/1994 | Sung et al. | |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzalez | |
| 5,477,836 A | 12/1995 | Hyodo et al. | |
| 5,508,582 A | 4/1996 | Sugimoto et al. | |
| 5,565,157 A | 10/1996 | Sugimoto et al. | |
| 5,694,908 A | 12/1997 | Hsu | |
| 5,722,362 A * | 3/1998 | Takano et al. | 123/295 |
| 5,740,784 A | 4/1998 | McKinney | |
| 5,782,092 A | 7/1998 | Schultalbers et al. | |
| 5,806,500 A | 9/1998 | Fargo et al. | |
| 5,875,743 A | 3/1999 | Dickey | |
| 5,887,566 A | 3/1999 | Glauber et al. | |
| 5,921,222 A | 7/1999 | Freeland | |
| 5,979,400 A * | 11/1999 | Nishide | 123/305 |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,213,086 B1 | 4/2001 | Chmela et al. | |
| 6,229,253 B1 | 5/2001 | Iwata et al. | |
| 6,234,123 B1 | 5/2001 | Iiyama et al. | |
| 6,318,083 B1 | 11/2001 | Machida et al. | |
| 6,325,039 B1 | 12/2001 | Goto | |
| 6,382,225 B1 | 5/2002 | Tipton | |
| 6,494,192 B1 | 12/2002 | Capshaw | |
| 6,505,579 B1 | 1/2003 | Lee | |
| 6,553,974 B1 | 4/2003 | Wickman et al. | |
| 6,617,769 B2 | 9/2003 | Suzuki | |
| 6,619,242 B2 | 9/2003 | Kaneko | |
| 6,622,690 B2 * | 9/2003 | Ando et al. | 123/295 |
| 6,651,432 B1 | 11/2003 | Gray, Jr. | |
| 6,659,068 B2 | 12/2003 | Urushihara et al. | |
| 6,681,739 B2 * | 1/2004 | Mamiya et al. | 123/295 |
| 6,691,669 B2 | 2/2004 | Surnilla et al. | |
| 6,698,387 B1 | 3/2004 | McFarland et al. | |
| 6,711,893 B2 | 3/2004 | Ueda et al. | |
| 6,792,966 B2 | 9/2004 | Harvey | |
| 6,845,616 B2 | 1/2005 | Jauss | |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 | 12/2005 | Partridge et al. | |
| 6,978,762 B2 | 12/2005 | Mori | |
| 6,988,485 B2 | 1/2006 | Ichise et al. | |
| 6,990,956 B2 | 1/2006 | Niimi | |
| 7,055,500 B2 | 6/2006 | Miyashita et al. | |
| 7,082,926 B2 | 8/2006 | Sadakane et al. | |
| 7,159,568 B1 | 1/2007 | Lewis et al. | |
| 7,178,503 B1 | 2/2007 | Brehob | |
| 7,225,787 B2 | 6/2007 | Bromberg et al. | |
| 7,255,080 B1 | 8/2007 | Leone | |
| 7,261,064 B2 | 8/2007 | Bhaisora et al. | |
| 7,278,396 B2 | 10/2007 | Leone et al. | |
| 7,287,492 B2 | 10/2007 | Leone et al. | |
| 7,287,509 B1 | 10/2007 | Brehob | |
| 7,293,552 B2 | 11/2007 | Leone et al. | |
| 7,350,504 B2 * | 4/2008 | Yasunaga et al. | 123/406.47 |
| 7,373,931 B2 * | 5/2008 | Lennox et al. | 123/525 |
| 7,869,930 B2 * | 1/2011 | Stein et al. | 701/104 |
| 2001/0035215 A1 | 11/2001 | Tipton et al. | |
| 2003/0089337 A1 | 5/2003 | Cohn et al. | |
| 2003/0127072 A1 | 7/2003 | Gmelin et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0250790 A1 | 12/2004 | Heywood et al. | |
| 2004/0261763 A1 | 12/2004 | Hashimoto et al. | |
| 2005/0051135 A1 | 3/2005 | Tomoda et al. | |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane et al. | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2006/0180099 A1 | 8/2006 | Aimoto et al. | |
| 2006/0191727 A1 | 8/2006 | Usami et al. | |
| 2007/0028861 A1 | 2/2007 | Kamio et al. | |
| 2007/0028905 A1 | 2/2007 | Shinagawa et al. | |
| 2007/0034192 A1 | 2/2007 | Kamio et al. | |
| 2007/0119391 A1 | 5/2007 | Fried et al. | |
| 2007/0119392 A1 | 5/2007 | Leone et al. | |
| 2007/0119394 A1 | 5/2007 | Leone | |
| 2007/0119411 A1 | 5/2007 | Kerns | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 | 5/2007 | Lewis et al. | |
| 2007/0119425 A1 | 5/2007 | Lewis et al. | |
| 2007/0204813 A1 | 9/2007 | Arai et al. | |
| 2007/0215069 A1 | 9/2007 | Leone | |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215110 A1 | 9/2007 | Stein et al. | |
| 2007/0215111 A1 | 9/2007 | Surnilla | |
| 2007/0215125 A1 | 9/2007 | Dearth et al. | |
| 2007/0215127 A1 | 9/2007 | Dearth et al. | |
| 2007/0215130 A1 | 9/2007 | Shelby et al. | |
| 2007/0219674 A1 | 9/2007 | Leone | |
| 2007/0219701 A1 | 9/2007 | Hashimoto et al. | |
| 2007/0221163 A1 | 9/2007 | Kamio | |
| 2007/0234976 A1 | 10/2007 | Dearth et al. | |
| 2007/0235009 A1 * | 10/2007 | Nakashima et al. | 123/458 |
| 2007/0289573 A1 | 12/2007 | Leone et al. | |
| 2007/0295307 A1 | 12/2007 | Kerns | |
| 2009/0065409 A1 | 3/2009 | Kamio et al. | |
| 2009/0159057 A1 | 6/2009 | Pursifull et al. | |
| 2009/0178654 A1 | 7/2009 | Leone et al. | |

FOREIGN PATENT DOCUMENTS

| | | |
|---|---|---|
| JP | 61065066 | 4/1986 |
| JP | 2007/0756754 | 3/2007 |
| JP | 2008-82258 A * | 4/2008 |
| WO | WO 2004/097198 | 11/2004 |

| WO | WO 2006/055540 | 5/2006 |
| WO | WO 2007/106354 | 9/2007 |
| WO | WO 2007/106416 | 9/2007 |

OTHER PUBLICATIONS

Kamio, J. et al., "Study on HCCI-SI Combustion Using Fuels Containing Ethanol," SAE Technical Papers Series No. 2007-01-4051, Powertrain & Fluid Systems Conference & Exhibition, Rosemont IL., Oct. 29-Nov. 1, 2007, 12 pages.
Leone, Thomas G. et al., "On Board Water Addition for Fuel Separation System," U.S. Appl. No. 12/117,167, filed May 8, 2008, 25 pages.
Leone, Thomas G. et al., "Fuel System for Multi-Fuel Engine," U.S. Appl. No. 12/184,064, filed Jul. 31, 2008, 40 pages.
U.S. Appl. No. 60/780,319, filed Mar. 8, 2006, Bromberg et al.
U.S. Appl. No. 11/682,372, filed Mar. 6, 2007, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/832,836, filed Jul. 24, 2006, Bromberg et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/923,418, filed Oct. 24, 2007, Leone et al.
U.S. Appl. No. 11/924,395, filed Oct. 25, 2007, Brehob.
U.S. Appl. No. 11/464,172, filed Aug. 11, 2006, Stein.
U.S. Appl. No. 11/962,683, filed Dec. 21, 2007, Pursifull et al.
U.S. Appl. No. 11/955,246, filed Dec. 12, 2007, Pursifull et al.
U.S. Appl. No. 11/566,131, filed Dec. 1, 2006, Blumberg et al.
U.S. Appl. No. 11/776,120, filed Jul. 11, 2007, Stein et al.
U.S. Appl. No. 12/014,952, filed Jan. 16, 2008, Leone et al.
D.R. Crohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Techonology.
L. Bromberg et al., "Calculations of Knock Suppressions in Highly Turbocharged Gasoline/Ethanol Engines Using Direct Ethanol Injection", Jul. 7, 2005, Massachusetts Institute of Technology.
Stephen Russ, "A Review of the Effect of Engine Operating Conditions on Borderline Knock", SAE Technical Paper Series 960497, Feb. 26-29, 1996.
S. Brusca et al., "Water Injection in IC-SI Engines to Control Detonation and to Reduce Pollutant Emissions", SAE Technical Paper No. 2003-01-1912, May 19-22, 200.
Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.
Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

* cited by examiner

DIRECTLY INJECTED INTERNAL COMBUSTION ENGINE SYSTEM

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder. Engines have also been described using more than one injector to provide fuel to a single cylinder in an attempt to improve engine performance. Specifically, in US 2005/0155578 an engine is described using a port fuel injector and a direct injector in each cylinder of the engine.

Another approach utilizing multiple injection locations for different fuel types is described in the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. Specifically, the Heywood et al. papers describes directly injecting ethanol to improve charge cooling effects, while relying on port injected gasoline for providing the majority of combusted fuel over a drive cycle.

The inventors herein have recognized several issues with such systems. For example, it may be desirable to utilize two direct in-cylinder injectors for each cylinder in order to expand the operating range of certain combustion modes by enabling the delivery of different substances directly to the combustion chamber. However, in-cylinder direct injection systems can add significant cost and complexity to the engine system.

As one example, the above issues may be addressed by an engine system for a vehicle, comprising a combustion chamber; a first in-cylinder direct injector configured to deliver a first substance including at least gasoline directly to the combustion chamber at a first pressure; and a second in-cylinder direct injector configured to deliver a second substance including at least an alcohol directly to the combustion chamber at a second pressure less than the first pressure.

As another example, the above issues may be addressed by a method of operating an internal combustion engine including at least one combustion chamber, comprising: during each of a plurality of cycles of the combustion chamber: injecting a first substance including at least gasoline directly into the combustion chamber at a first pressure via a first in-cylinder direct injector; injecting a second substance including at least an alcohol directly into the combustion chamber at a second pressure less than the first pressure via a second in-cylinder direct injector; and initiating combustion of a mixture of air and the first and the second injected substances within the combustion chamber.

In this way, it is possible to provide different substances directly to the combustion chamber while also reducing the cost and complexity of one of the injection systems by instead utilizing a lower pressure injector for the delivery of a knock suppressing substance such as an alcohol. Further, engine knock may be reduced during spark ignition operation and auto-ignition timing may be controlled during the controlled auto-ignition operation by adjusting the amounts and/or timings of the delivery of two or more different substances via separate higher and lower pressure direct injections systems as will be described in greater detail herein.

DETAILED DESCRIPTION

Figure 1:
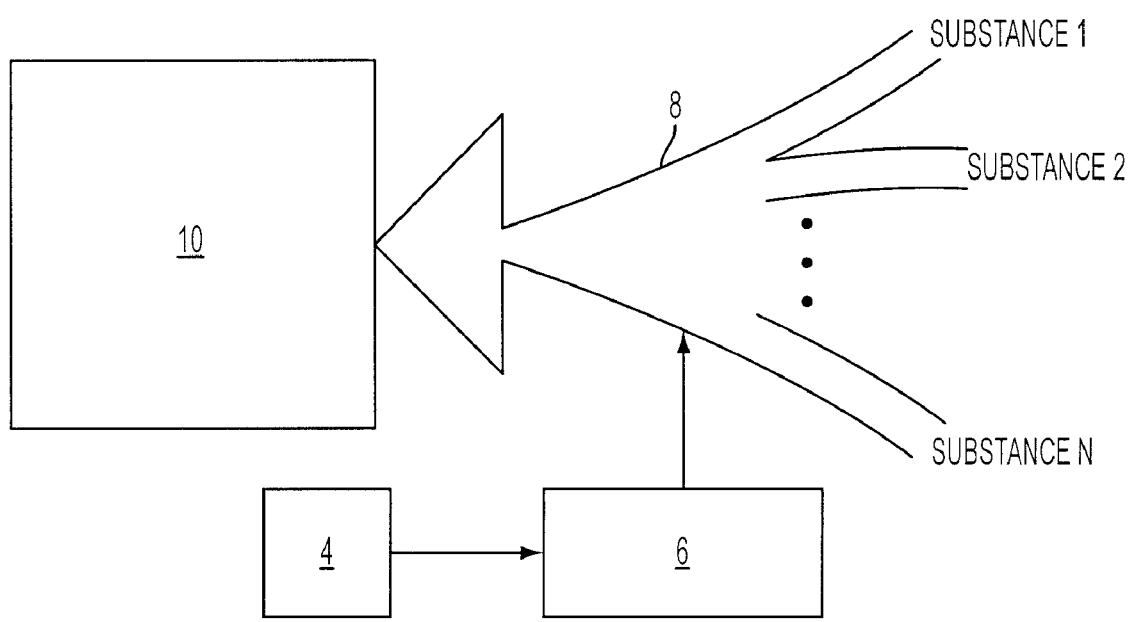
FIG. 1 shows a depiction of an engine receiving a plurality of substances.

FIG. 1 shows an engine 10 receiving delivery of a plurality of substances (1, 2, . . . , N) via arrow 8. The various substances may include multiple different fuels, fuel blends or other suitable substances. In one example, multiple different substances having different gasoline and/or alcohol and/or water concentrations may be delivered to the engine, and may be delivered in a mixed state, or separately delivered. Further, the relative amounts and/or ratios of the different substances provided may be controlled by a control system 6 in response to operating conditions, which may be provided and/or inferred via sensor(s) 4. Alternatively, or under some conditions, the relative amounts and/or ratios may be determined by the fuel blend added to the vehicle by the customer, and thus may not significantly vary during operation.

In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc as a second substance. In still another example, the first substance may be a gasoline alcohol blend with a lower alcohol concentration than a gasoline alcohol blend of a second substance.

In one embodiment, when using both gasoline and a fuel having alcohol (e.g., ethanol), it may be possible to adjust operating conditions to take advantage of the increased charge cooling of alcohol fuels (e.g., via direct injection) to provide improved engine performance, because of the different properties of alcohol. This phenomenon, combined with increased compression ratio, and/or boosting and/or engine downsizing, can then be used to obtain fuel economy benefits (by reducing the knock limitations on the engine), while also allowing engine operation with improved engine output torque, for example.

Figure 2:
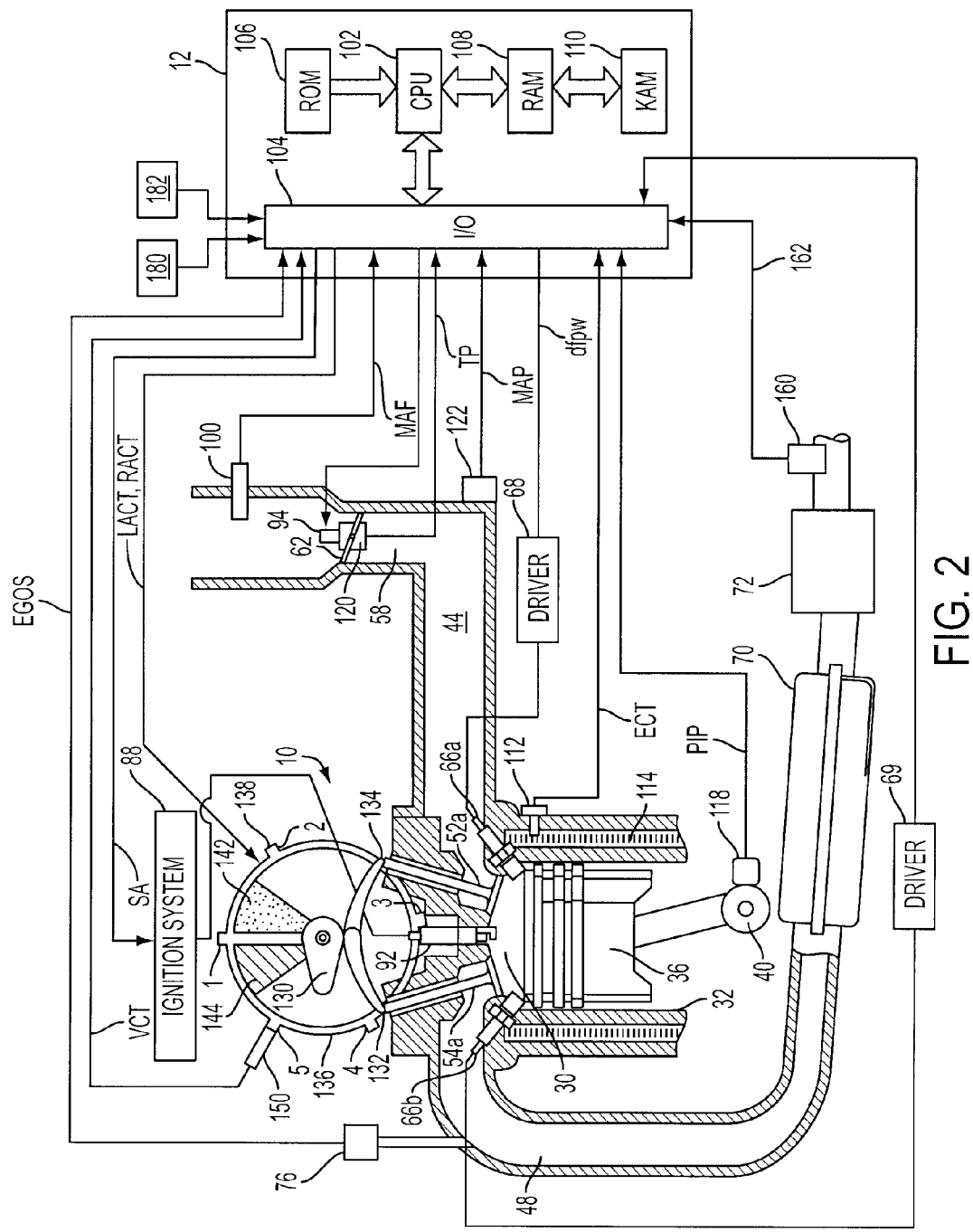
FIG. 2 shows a schematic depiction of an example engine including two in-cylinder direct injectors.

Referring now to FIG. 2, a single cylinder of a multi-cylinder engine, as well as the intake and exhaust paths connected to that cylinder are shown. Engine 10 is capable of using a plurality of different fuel blends as described above, for example, with reference to FIG. 1. As one example, engine 10 may utilize a mixture of gasoline and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gas), etc.

In the embodiment shown in FIG. 2, engine 10 includes a first in-cylinder direct injector 66a and a second in-cylinder direct injector 66b. The first injector 66a may be operated to inject a first substance into the combustion chamber and the second injector may be operated to inject a second substance into the combustion chamber. In some examples, the first and second substances may include the same or similar composition and may be provided to the injectors from a common storage tank. In other examples, the second substance may have a different composition than the first substance, and maybe provided to the injectors from different or segregated storage tanks, or may be separated from a fuel mixture by a fuel separator.

As one example, the first substance may include a fuel and the second substance may include a knock suppressing substance such as ethanol, methanol, or water. Injectors 66a and 66b may have different configurations for injecting different substances as described in greater detail with reference to FIG. 4.

Internal combustion engine 10, comprising a plurality of combustion chambers, is controlled by electronic engine controller 12. Electronic engine controller 12 may be a component of control system 6 described with reference to FIG. 1. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used. In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. Conventionally, the compression ratio is in the range of 9:1 to 10:1 However, when higher octane fuels, fuels with a higher latent enthalpy of vaporization, and/or direct injection is used, the compression ratio can be raised due to the mitigating effects that octane, latent enthalpy of vaporization, and direct injection have on knock.

Fuel injectors 66a and 66b are shown directly coupled to combustion chamber 30 for delivering injected fuel or other substance directly therein in proportion to the pulse width of signal dfpw received from controller 12 via electronic drivers 68 and 69, respectively. While FIG. 2 shows injectors 66a and 66b as side mounted injectors, one or both of the injectors may be instead located overhead of the piston, such as near the position of spark plug 92. Such a position may improve mixing and combustion due to the lower volatility of some alcohol based fuels. Alternatively, one or both of the injectors may be located overhead and near the intake valve to improve mixing. Additional injectors may also be used, such as port configured injectors.

A first substance may be delivered to direct injector 66a by a higher pressure fuel system including a fuel tank, one or more of fuel pumps, and a fuel rail. The first substance may include gasoline only, mixtures of gasoline and alcohol, or mixtures of gasoline and water, among other combinations. A second substance may be delivered to direct injector 66b by a lower pressure fuel system including a fuel tank, and a fuel pump at a lower pressure than the higher pressure fuel system, in which case the timing of the direct fuel injection provided by injector 66b may be more limited during the compression stroke than with the higher pressure fuel system coupled to injector 66a. The second substance can include alcohol only (e.g. ethanol, methanol, etc.), mixtures of alcohol and gasoline, or mixtures of alcohol, gasoline, and water. As one non-limiting example, the second substance provided by the lower pressure fuel system may include a greater concentration of alcohol than the first substance provided by the higher pressure fuel system. As another non-limiting example, the first and the second substance may include the same concentration or ratios of gasoline and alcohol. While not shown, the fuel lines supplying the various substances to injectors 66a and 66b may include a pressure transducer providing a signal to controller 12 for managing pump operation.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway. In the latter alternative, throttle plate 62 is actuated by the operator of the vehicle, the cable, or other device, between the accelerator pedal and the throttle valve not shown.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric, homogeneous mode of operation.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating injector 66 during an intake stroke (which may be open valve injection). In yet another example, a homogenous mixture may be formed by operating injector 66 before an intake stroke (which may be closed valve injection). In still other examples, multiple injections from injector 66 may be used during one or more strokes (e.g., intake, compression, exhaust, etc.). Even further examples may be where different injection timings and mixture formations are used under different conditions, as described below.

Controller 12 can adjust the amount of fuel or other substance delivered by fuel injectors 66a and 66b so that the homogeneous, stratified, or combined homogenous/stratified air/fuel mixture in chamber 30 can be selected to be at stoichiometry, a value rich of stoichiometry, or a value lean of stoichiometry. As one non-limiting example, controller 12 can control fuel injectors 66a and 66b so that a homogeneous charge is formed in the combustion chamber for facilitating homogeneous charge compression ignition (HCCI) via controlled auto-ignition (CAI) as will be described herein.

Emission control device 72 is shown positioned downstream of catalytic converter 70. Emission control device 72 may be a three-way catalyst, particulate filter, NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute manifold pressure signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide a plurality (usually two) cam profiles which can be selected based on operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and it is understood that each cylinder has its own set of intake/exhaust valves, pair of in-cylinder direct fuel injectors, spark plug, etc.

Figure 3:
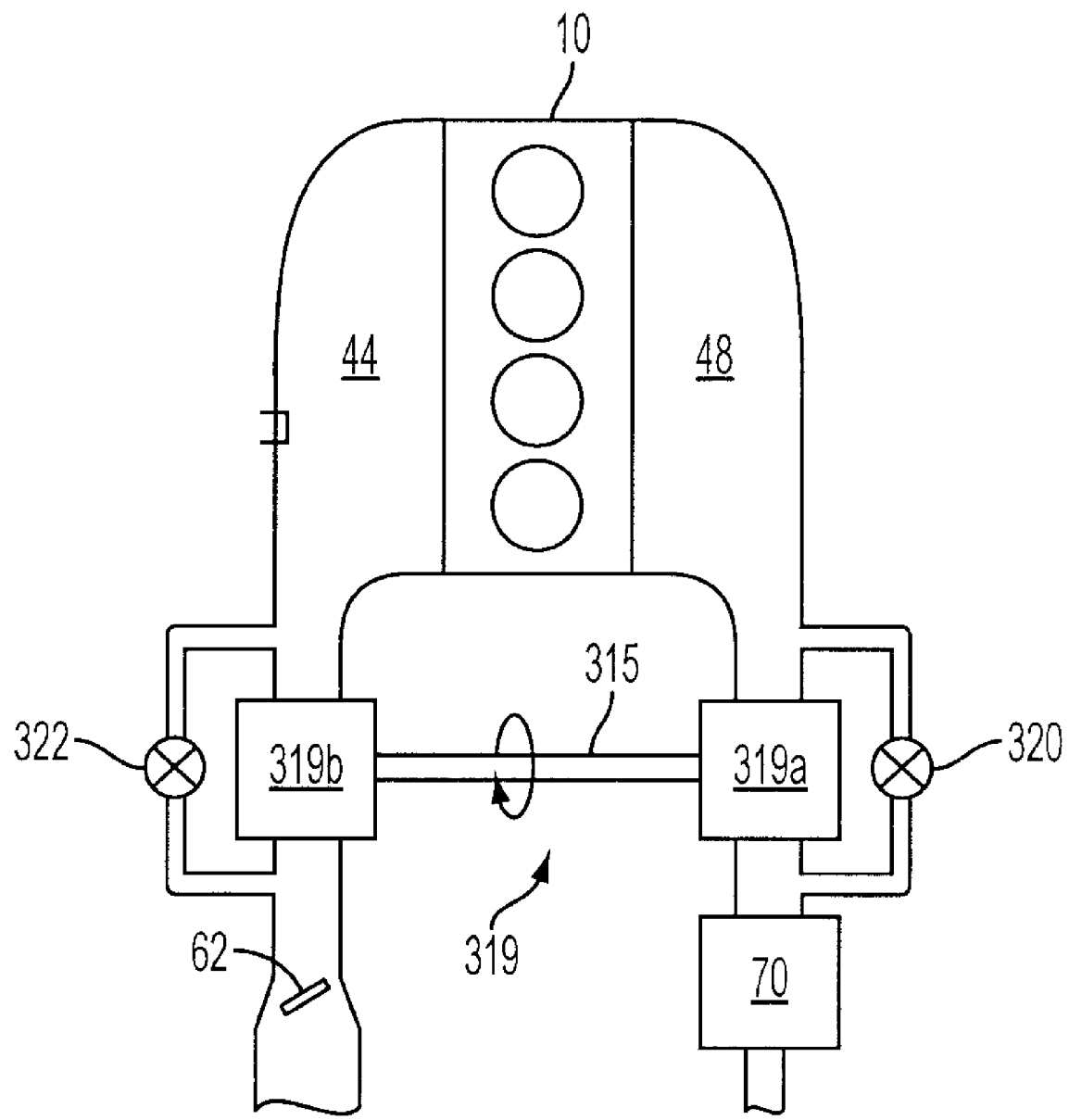
FIG. 3 shows a schematic depiction of an example engine including a boosting device such as a turbocharger.

While not shown in FIG. 2, engine 10 may be coupled to various boosting devices, such as a supercharger or turbocharger, as shown in FIG. 3. On a boosted engine, desired torque may also be maintained by adjusting wastegate and/or compressor bypass valves.

Referring now specifically to FIG. 3, an example engine 10 is shown with four in-line cylinders. In one embodiment, engine 10 may have a turbocharger 319, which has a turbine 319a coupled to the exhaust manifold 48 and a compressor 319b coupled to the intake manifold 44. While FIG. 3 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be controlled via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a mechanically or electrically driven supercharger may be used, if desired.

Figure 4A:
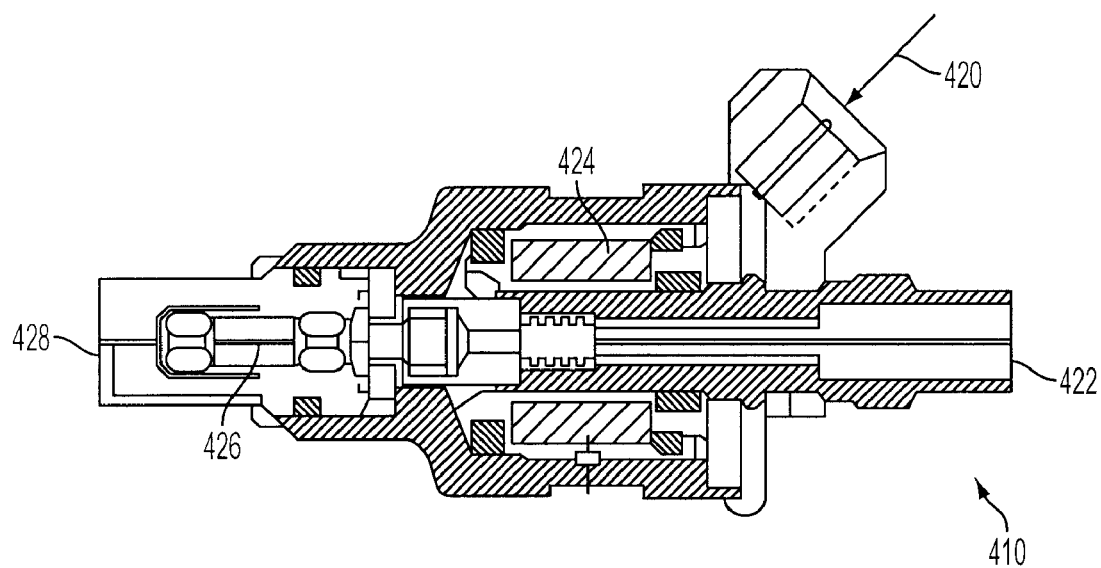
FIG. 4 shows a schematic depiction of the two in-cylinder direct injectors.
Figure 4B:
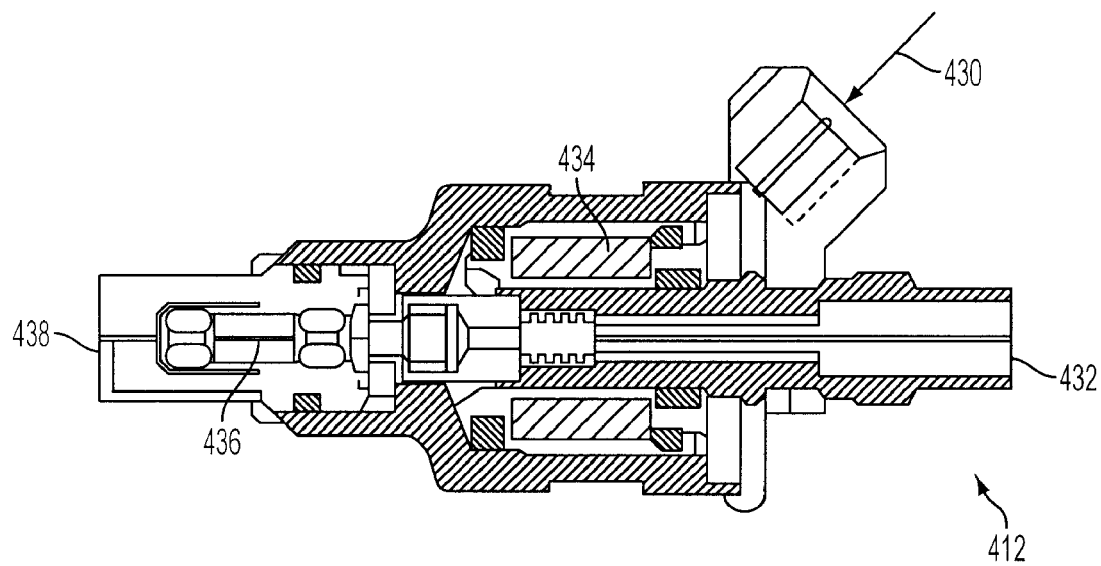

Referring now to FIG. 4, two fuel injectors are shown (410 and 412). As one-example, injectors 410 and 412 may have with at least one different characteristic. Injector 410 may be used as direct injector 66a, while injector 412 may be used as direct injector 66b. The differing characteristic(s) between the injectors may be one or more of the following: injector size, injector dynamic range, materials, minimum pulse width, injector slope (flow to pulse width), orifice size, spray pattern, spray pattern area, spray targeting, or others as discussed herein. For example, injector 410 may be used as direct injector 66a to provide first substance to the combustion chamber at a higher pressure than injector 412, which may be used as direct injector 66b to provide a second substance different than the first substance to the combustion chamber at a lower pressure.

In one example, both injectors may be sized to meet peak torque requirements (for example a maximum airflow or aircharge). However, in an example where one injector provides gasoline and the other injector provides an alcohol blend (e.g., ethanol, E85, methanol, etc.), the power densities of the fuels may be different. In such a case, the injector for the alcohol based fuel may be sized to provide a different maximum fuel flow (e.g., approximately 37% higher to account for pure ethanol).

Referring now specifically to FIG. 4, injector 410, which is a direct cylinder injector, is shown receiving a command signal 20 from controller 12. Pressurized fuel is supplied to inlet 22, the flow of which is governed by an electromagnetic actuator having coil 24, coupled to needle 26 cooperating with pintle 28. The shape of pintle 28 may affect the spray geometry as well as the flow rate of the injector. Further, the size and shape of the needle may also affect flow and spray patterns, as well as response time.

FIG. 4 also shows injector 412, with similarly labeled components, including a command signal 430, inlet 432, coil 434, needle 436, and pintle 438. As noted above, the pintles 428 and 438 may different in size, shape, material, or combinations thereof. Further, inlets 422/432, coils 424/434, and/or needles 426/436 may have different geometry, shapes, sizes, materials, weights, surface finishes, etc.

In this way, the respective injectors may be designed to provide different functionality and/or injection type (e.g., fuel type) compatibility so that improved engine operation and control may be achieved. As noted herein, an injection type may refer to different injection locations, different substances being injected (e.g., water vs. fuel), different fuel types being injected, different fuel blends being injected, different alcohol contents being injected (e.g., 0% vs. 85%), etc. Further note that different injection types may also refer to different substances being injected via a common injector, where a type 1 injection may be a gasoline amount in the injection and type 2 injection may be an alcohol amount in the injection.

Figure 5A:
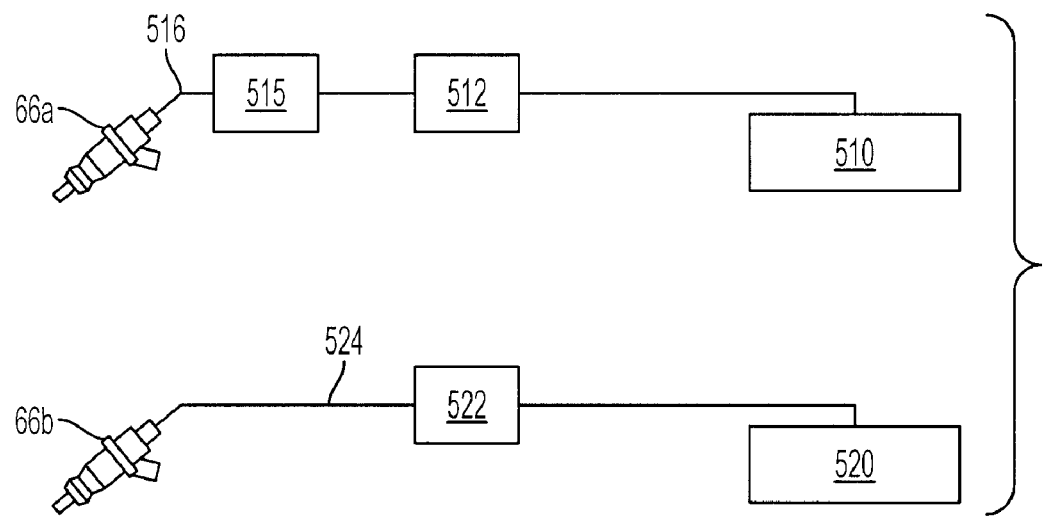
FIG. 5A shows a first schematic depiction of example fuel systems connected to the injectors.
Figure 5B:
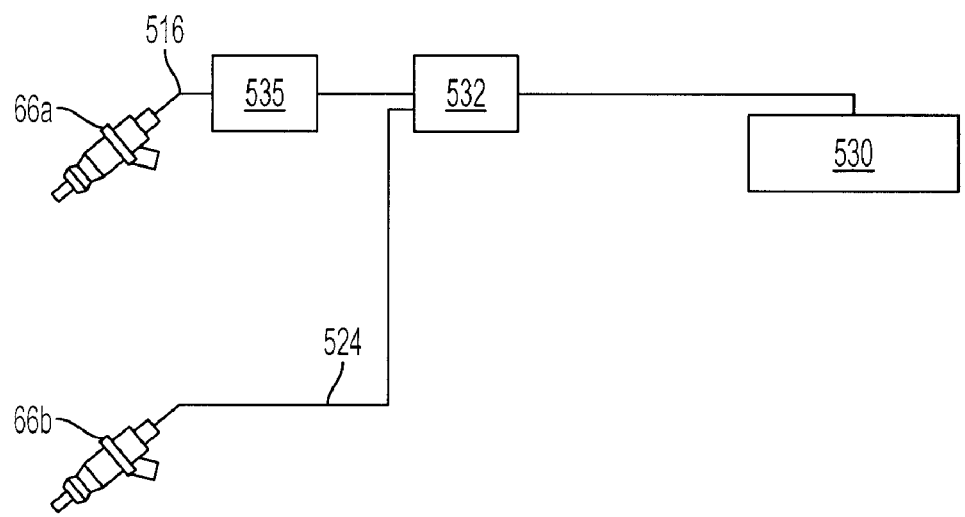
FIG. 5B shows a second schematic depiction of example fuel systems connected to the injectors.

Referring now to FIGS. 5A and 5B, various fuel systems are described. Specifically, FIG. 5A shows an example of two independent fuel systems that may be used with injectors 66a and 66b, while FIG. 5B shows an example of two fuel systems that share a common fuel pump.

Referring now specifically to FIG. 5A, fully independent fuel systems are shown for delivering a first and a second substance to the engine via separate in-cylinder injectors. Specifically, a first tank 510 for holding a first substance is shown fluidly coupled with injector 66a via a lower pressure pump 512, a higher pressure pump 515, and fuel rail 516. Pump 512 may be configured as a lift pump and may be arranged within the tank 510. As one non-limiting example, the lower pressure pump 512 and higher pressure pump 515 in combination can deliver the first substance to injector 66a from tank 510 at a pressure within the range of 35 bar and 150 bar. In other examples, the effective pressure increase provided to injector 66a from tank 510 in the first example by pumps 512 and 515 may be instead provided by a single pump or by three or more pumps. Furthermore, it should be appreciated that while example pressure ranges for the higher pressure fuel system associated with injector 66a have been provided, other pressure ranges may be provided in other examples.

A second tank 520 for holding a second substance is shown fluidly coupled with injector 66b via a lower pressure pump 522 and fuel rail 524. As one non-limiting example, pump 522 can deliver the second substance to injector 66b from tank 520 at a pressure within the range of 20 and 35 bar. However, it should be appreciated that in other examples, higher or lower pressures may be provided by pump 522. Further, it should be appreciated that the fuel system associated with injector 66b can include two or more pumps. Pump 522 may be configured as a lift pump in some examples, and may be arranged within tank 520.

In one example, the tank 510 contains a gasoline or a gasoline and alcohol blend with a greater concentration of gasoline than tank 520, while the tank 520 contains an alcohol or alcohol and gasoline blend which contains a greater concentration of alcohol than tank 510. However, other fuel types or substances may also be used as described herein.

Further still, it should be appreciated that in some examples, tanks 510 and 520 may form a common tank, whereby the first substance provided to the engine via injector 66a and the second substance provided to the engine via injector 66b may include the same composition. For example, injectors 66a and 66b may receive a fuel mixture including gasoline and an alcohol from a common fuel tank at different pressures via separate pumps.

Referring now to FIG. 5B, two fuel systems are shown for providing a fuel to the engine at different pressures. The example of FIG. 5B includes a single tank 530 holding a common fuel mixture. Thus, the first substance and the second substance provided to the engine via injectors 66a and 66b, respectively, can include the same composition. For example, a mixture of gasoline and an alcohol such as ethanol may be provided to the engine at different pressures from a tank 530. The fuel mixture can be first pressurized by a common lower pressure pump or lift pump 532. The higher pressure system associated with injector 66a can then raise the pressure further via pump 535 in contrast to the lower pressure system associated with injector 66b. As one non-limiting example, injector 66a can receive the first substance (e.g. fuel mixture) at a pressure within the range of between 35 bar and 150 bar and injector 66b can receive the second substance (e.g. the same fuel mixture) at a pressure within the range of between 20 bar and 35 bar.

One or both the fuel systems shown in FIGS. 5A and 5B may be returnless-type fuel systems, return-type fuel systems, or combinations thereof Further, the fuel systems may have different characteristics, such as different size tanks, different size pump, different pump capacity, different pump pressure, different pump maximum flows, different on/off cycles (e.g., pump 512 may run more intermittently than pump 522), etc. Note that in some examples only one pump may operate under some conditions. For example, if fuel from tank 510 is not needed, or not enabled (e.g., during cold start conditions), pump 512 may be deactivated (or not activated) while pump 522 operates. In this way, less battery power may be used, and less vapors may be generated.

Figure 6A:
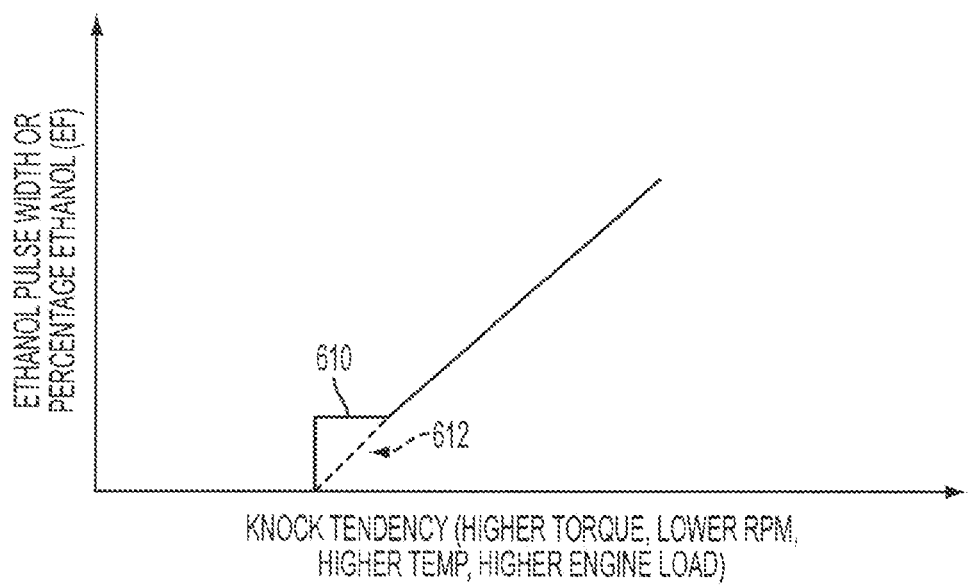
FIG. 6 shows a graphical depiction of how the delivery of an absolute and/or relative amount of a knock suppressing substance such as can be varied with knock tendency.

Referring now to FIG. 6A, a graph illustrating an example of how an amount (absolute amount or relative amount with reference to another substance) of a knock suppressing substance (e.g. an alcohol) such as ethanol that is delivered to the combustion chamber in response knock tendency (e.g., as torque increases, as speed reduces, as temperature increases, as humidity decreases, and/or combinations thereof). The graph in FIG. 6A illustrates with line 610 (versus 612) that when first phasing in ethanol (in addition to gasoline) at medium to high load, for example, near zero ethanol injection may not be feasible. As such, the control system can add a selected amount of ethanol or other knock suppressing substance at or near the minimum pulse width. In this way, for example, it is possible to provide sufficient ethanol to reduce tendency for knock without violating the minimum stable pulse width of the ethanol injectors. The approach shown in FIG. 6A may be used, for example, during spark ignition operation.

Figure 6B:
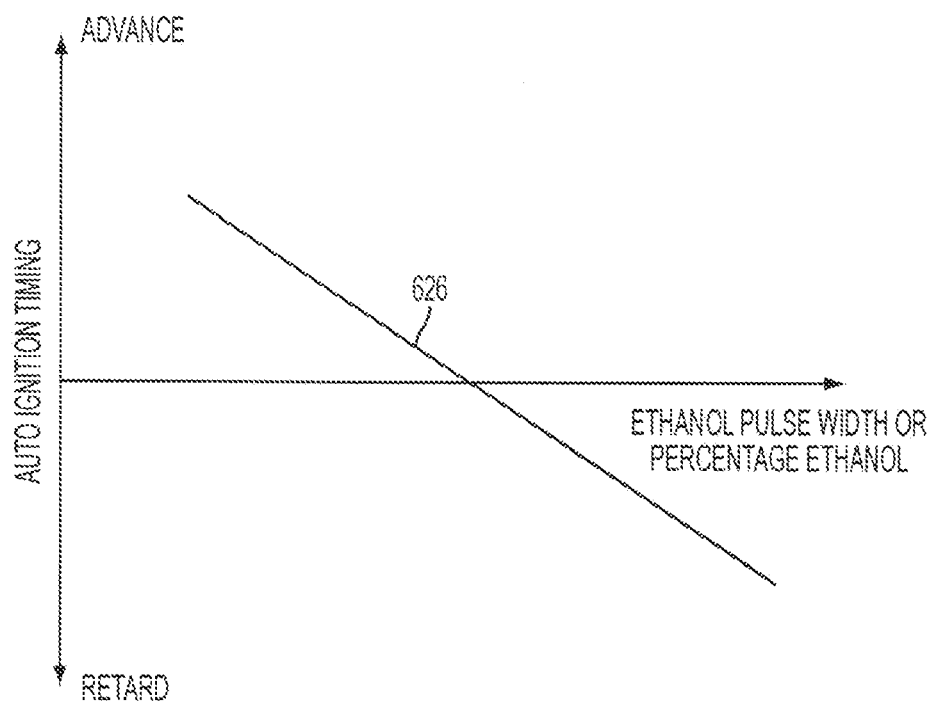

Referring now to FIG. 6B, a graph illustrating how the amount of the knock suppressing substance such as ethanol may be changed to either retard or advance auto-ignition where the combustion process in the combustion chamber is carried out by controlled auto-ignition. The ethanol pulse width or percentage ethanol is shown on the horizontal axis, while the auto-ignition timing is shown along the vertical axis. The ethanol or knock suppressing substance directly injected into the cylinder can be varied to provide the desired charge cooling effect, thereby affecting the timing of auto-ignition. The amount of cooling can therefore be controlled by varying the absolute and/or relative amount of knock suppressing substance injected into the cylinder. For example, the auto-ignition timing may be advanced by reducing the absolute or relative amount (relative to the delivery of another substance such as gasoline) of the knock suppressing substance such as ethanol that is delivered to the combustion chamber. Alternatively, the auto-ignition timing may be retarded by reducing the absolute and/or relative amount of knock suppressing substance such as ethanol that is delivered to the combustion chamber. Thus, the function described schematically by line 626 illustrates how ethanol pulse width or percentage ethanol can affect auto-ignition timing. In this way, the approach described with reference to FIG. 5B can be used where the combustion within the combustion chamber is initiated by auto-ignition.

Figure 7:
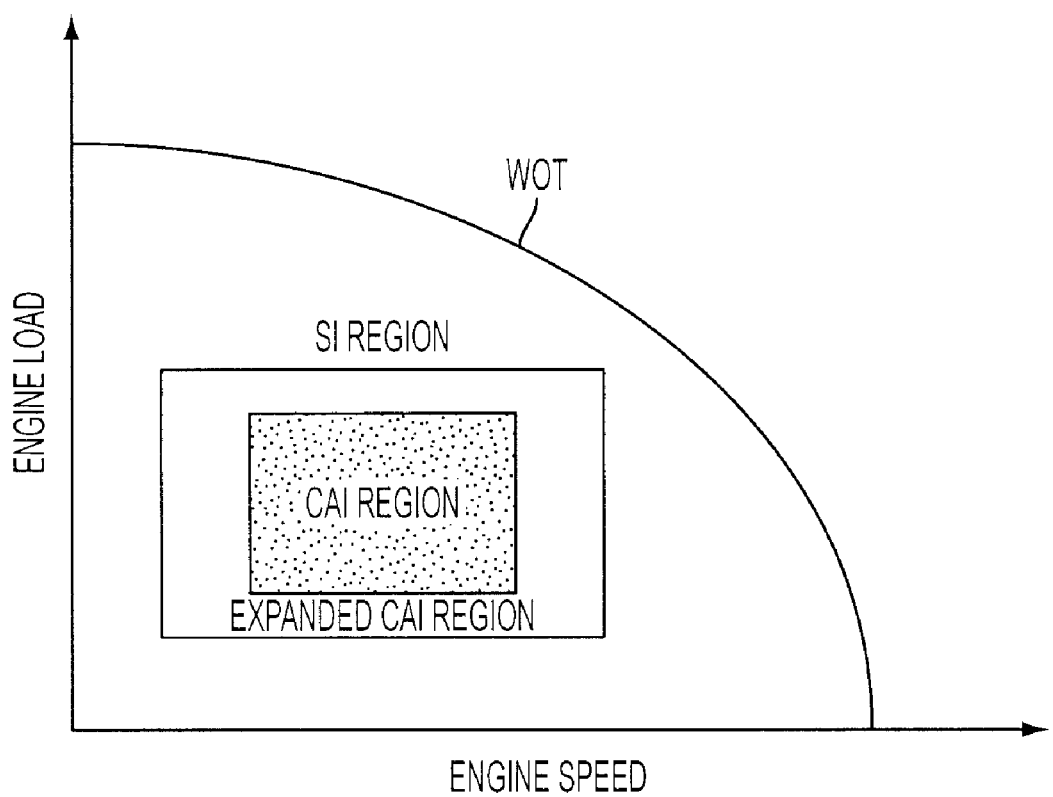
FIG. 7 shows a graphical depiction of an example mode map for spark ignition and controlled auto-ignition combustion modes.

FIG. 7 shows a graphical depiction of an example mode map for spark ignition and controlled auto-ignition combustion modes. In particular, the map of FIG. 7 shows how the SI operating mode and CAI operating modes may be performed for operating conditions such as engine load (as shown along the vertical axis) and engine speed (as shown along the horizontal axis). For example, the SI operating region as shown in FIG. 7 may be performed across substantially all operating conditions of the engine and is therefore bounded by the wide open throttle (WOT) curve, the vertical axis and the horizontal axis. Thus, as SI utilizes an ignition spark to control the timing of combustion, the SI operating mode may be more robust than the CAI operating mode. During operation in SI, the engine control system may control the injection of the knock suppressing substance as shown in FIG. 6A to reduce the knock tendency.

FIG. 7 also shows the CAI operating mode region as contained within a more limited operating range than the SI mode. For example, CAI may be more difficult to achieve at higher or lower engine loads and speeds since auto-ignition may be initiated by compression performed by the piston rather than by an ignition spark. Although in some examples, an ignition spark may be performed as a back-up to ensure that misfire does not occur. During operating in the CAI mode, such as to enable homogeneous charge compression ignition, the timing of auto-ignition may be controlled by varying the relative amounts of the fuel and knock suppression substance and/or absolute amount of the knock suppressing substance that is delivered to the combustion chamber as described with reference to FIG. 6B.

FIG. 7 also shows how the CAI mode operating range may be expanded in some examples by utilizing the knock suppressing substance such as ethanol to enable greater control of the auto-ignition timing as will be described in greater detail with reference to FIG. 8. Note that in some examples, the engine may be configured to operate in only the SI mode or only in the CAI mode. However, in some examples, the engine may be configured to operate between the SI mode and the CAI mode in response to operating conditions, for example, as directed by the mode map of FIG. 7. In other words, during higher or lower engine speed and engine load ranges, the SI mode may be performed whereby the addition of the knock suppressing substance may be used to reduce the knock tendency as described with reference to FIG. 6A. During engine speed and load conditions that are within the CAI or expanded CAI regions, the knock suppressing substance may be used to control the timing of auto-ignition as directed by FIG. 6B.

Figure 8A:
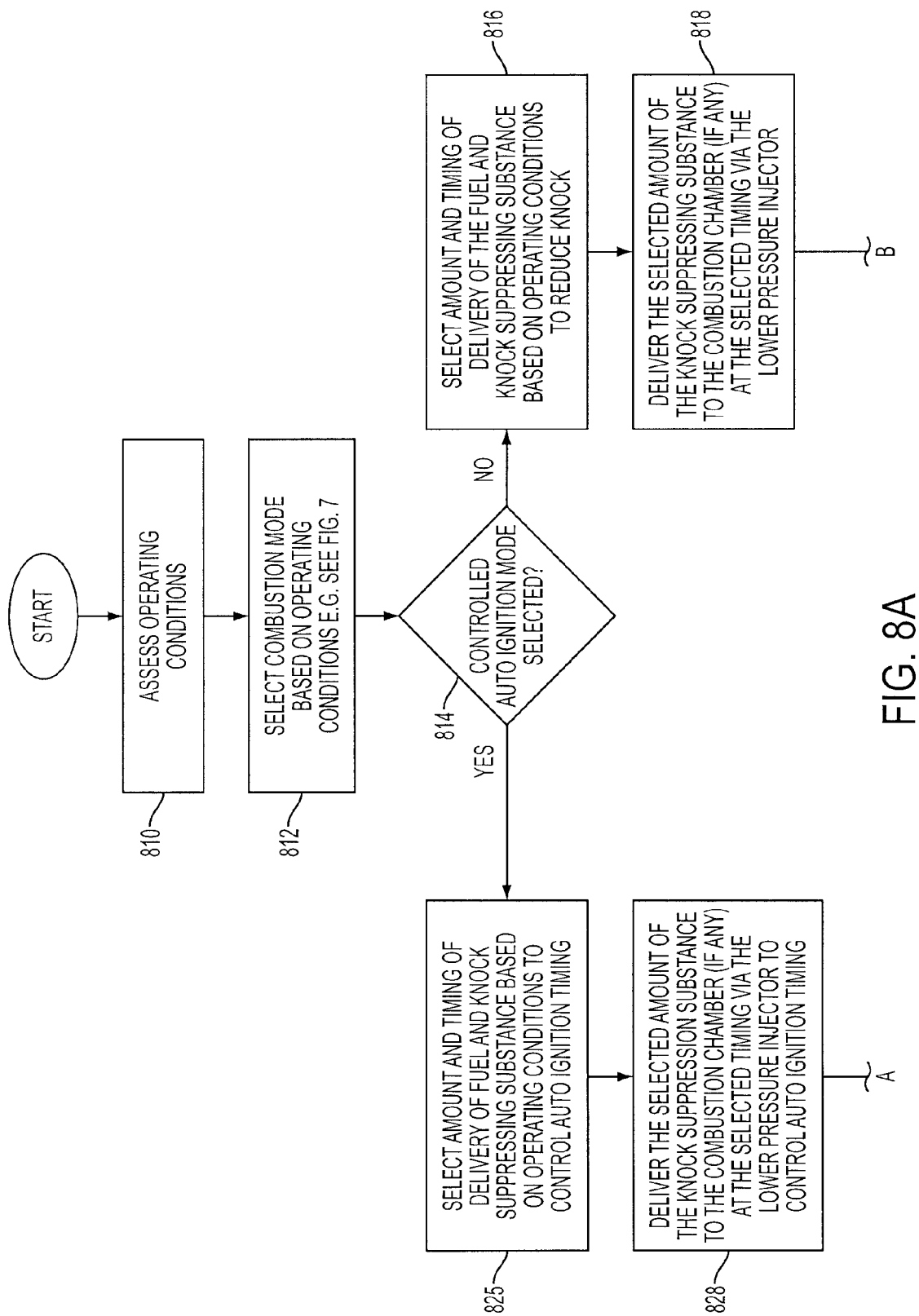
FIG. 8 is a flow chart depicting a control strategy for performing an injection strategy for the engine based on the selected combustion mode.
Figure 8B:
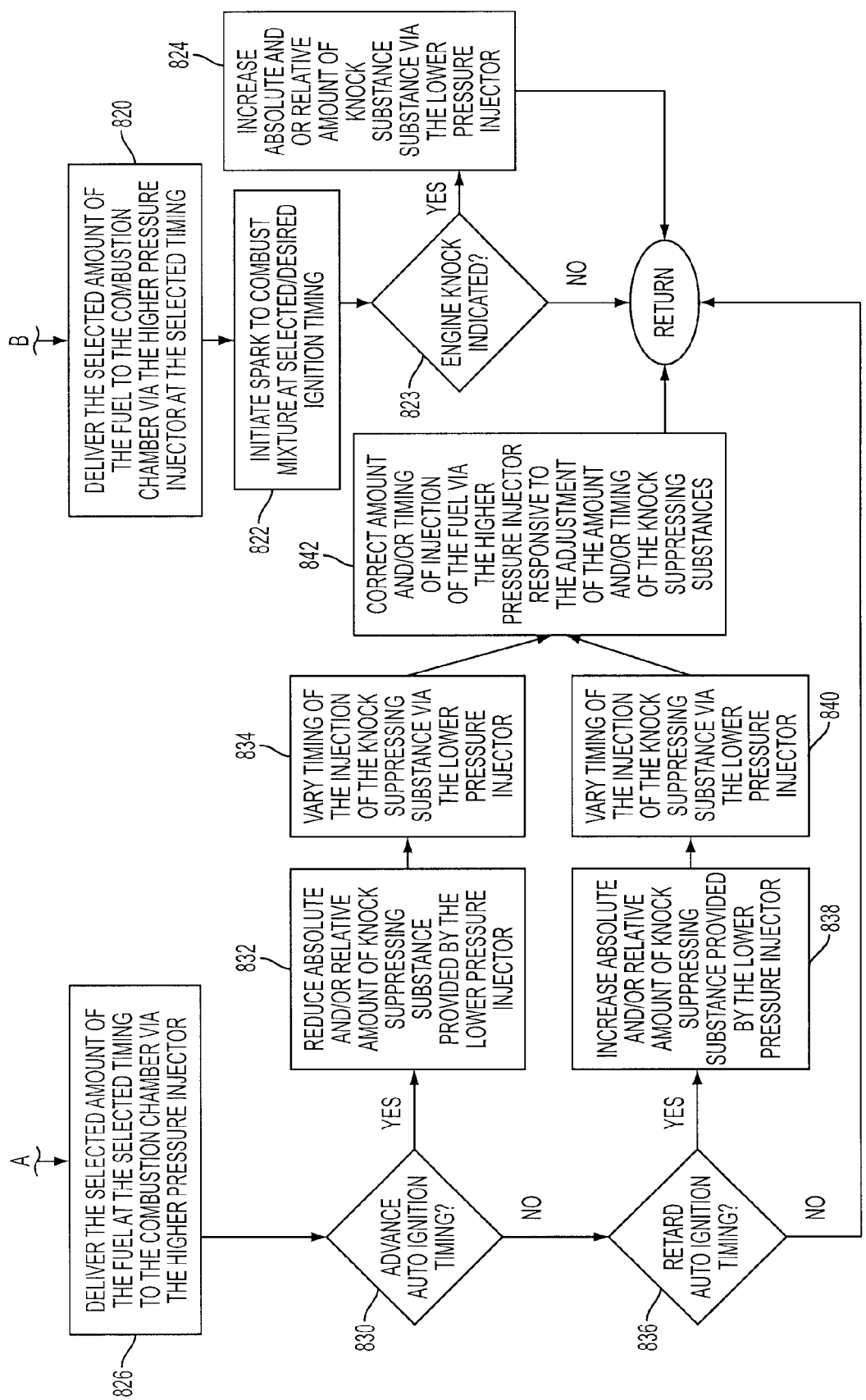

FIG. 8 is a flow chart depicting a control strategy for performing an injection strategy for the engine based on the selected combustion mode. As indicated at 810, the control system assesses various operating conditions such as engine speed, engine load, etc. via one or more sensors such as the exhaust gas sensor 76, Hall effect sensor 118, throttle position sensor 120, knock sensor 182, humidity sensor 180, cam timing sensor 150. At 812, a suitable combustion mode may be selected for the engine or at least one combustion chamber of the engine responsive to the operating conditions identified at 810. As one example, the control system may reference the mode map of FIG. 7 when selecting a suitable combustion mode.

As indicated at 814, if the CAI mode is selected at 812, the routine can proceed to 825. Alternatively, if the SI mode or other non-CAI mode is selected at 812, the routine can proceed to 816. As one example, the control system may initiate SI mode where the CAI mode is not selected as directed by the mode map of FIG. 7.

For example, at 816, the amount and timing of delivery of a fuel (e.g. gasoline) and a knock suppressing substance (e.g. an alcohol) may be selected based on operating conditions. As one example, the control system may reference a map or look-up table as described with reference to FIG. 6A, whereby the amount of the knock suppressing substance is controlled to reduce the knock tendency across a variety of engine conditions. At 818, the selected amount of the knock suppressing substance (e.g. ethanol) can be delivered to the combustion chamber at the selected timing via at least the lower pressure in-cylinder injector. At 820, the selected amount of the fuel substance (e.g. gasoline) can be delivered to the combustion chamber at the selected timing via at least the higher pressure in-cylinder injector. However, it should be appreciated that the fuel and the knock suppressing substance may also be provided to the combustion chamber via other injectors. At 822, the mixture of the fuel and knock suppressing substance may be combusted at the selected or desired ignition timing via an ignition spark. As one example, the control system may send an ignition command to ignition system 88 to initiate an ignition spark via spark plug 92.

As indicated at 823, if engine knock is indicated, for example, via a knock sensor, the absolute amount and/or relative amount of the knock suppressing substance that is delivered to the combustion chamber may be increased. For example, the pulse width of the lower pressure injector may be increased to provide additional knock suppressing substance to the combustion chamber to thereby reduce engine knock. Note that the increase in the absolute amount of the knock suppressing substance may also be accompanied by a corresponding reduction in the amount of the fuel provided to the combustion chamber via the higher pressure injector to maintain a prescribed air/fuel ratio. Thus, air/fuel ratio detection in the exhaust gases may be used to assist the control system to vary the injections performed by the higher and lower pressure injectors responsive to knock detection.

Returning to 814, if CAI mode is selected, at 825 the amount and timing of the delivery of the fuel and knock suppressing substance may be selected based on the operating conditions identified at 810 to control the timing of auto-ignition. For example, the control system may reference a map or look-up table as described with reference to FIG. 6B. At 828, the selected amount of the knock suppressing substance may be delivered to the combustion chamber at the selected timing via at least the lower pressure injector to control the auto-ignition timing. At 826, the selected amount of the fuel may be delivered to the combustion chamber at the selected timing via the higher pressure injector.

At 830, it may be judged whether to advance the auto-ignition timing. For example, the control system may control the auto-ignition timing within a prescribed range around TDC. If the auto-ignition timing is to be advanced, at 832 the control system may reduce the absolute amount of the knock suppressing substance that is delivered to the combustion chamber and/or reduce the relative amount of the knock suppression substance compared to the fuel that is delivered to the combustion chamber. Additionally, or alternatively, the control system may vary the timing of the injection of the knock suppressing substance via at least the lower pressure injector to advance the auto-ignition timing.

Alternatively, at 836, if it is judged that the auto-ignition timing is to be retarded, then at 838, the control system may increase the absolute amount of the knock suppressing substance that is delivered to the combustion chamber and/or increase the relative amount of the knock suppression substance compared to the fuel that is delivered to the combustion chamber. Additionally, or alternatively, the control system may vary the timing of the injection of the knock suppressing substance via at least the lower pressure injector to retard the auto-ignition timing. Further, as indicated at 842, the control system may also vary the amount of the fuel delivered to the combustion chamber via the higher pressure injector responsive to a change in the absolute amount of the knock suppressing substance to maintain a prescribed air/fuel ratio.

In this way, the control system may utilize different fueling strategies via a lower pressure in-cylinder direct injector and a higher pressure in-cylinder direct injector depending on the selected combustion mode.

FIG. 9 shows timing diagrams depicting example injection strategies that may be used with the example engine systems and control methods described herein, whereby the combustion chamber is configured with two direct in-cylinder injectors that can deliver the same or different substances to the combustion chamber. Each of graphs 9A-9G show a plurality of four stroke engine cycles each including an intake stroke (I), a compression stroke (C), and power stroke (P), and an exhaust stroke (E). Further, the piston position is indicated between strokes as top dead center (TDC) and bottom dead center (BDC).

During at least a portion of the intake stroke, at least one intake valve of the cylinder may be momentarily opened to admit air into the combustion chamber. The air admitted to the cylinder may be compressed by the piston during the compression stroke along with any of the first and/or second substances that were delivered to the combustion chamber by the first and/or second direct in-cylinder injectors. After the mixture of air and either of the injected substances are compressed, the mixture may be ignited to provide for the power stroke, whereby the combustion causes the mixture to expand forcing the piston toward BDC. Note that combustion may be initiated by an ignition spark in the case of SI combustion or by compression performed by the piston in the case of CAI combustion. Finally, at least some of the products of the combustion event may be exhaust from the cylinder during the exhaust stroke by momentarily opening at least one of the exhaust valves to release the gases from the combustion chamber. In this way, the four stroke cycle may be repeated.

Note that the cycles shown in each of the graphs of FIGS. 9A-9G may be sequentially performed as shown or may be separated by one or more intermediate cycles. Further, it should be appreciated that while a four stroke operation has been described with reference to FIG. 9, in other embodiments, the engine may be operated with two strokes per cycle, six strokes per cycle, or any other suitable number of strokes per cycle.

In each of the examples of FIG. 9, the delivery of the first substance (e.g. a knock suppressing substance such as an alcohol) via the lower pressure direct injector has been indicated by the un-shaded region 910 and the delivery of the second substance (e.g. a fuel such as gasoline) via the higher pressure injector has been indicated by the shaded region 920. As described herein, the first and/or the second substances may include liquids, or may alternatively include vapors. Thus, the second substance may include at least a fuel such as gasoline and the first substance may include at least a knock suppressing substance of a greater concentration than the second substance or vice-versa.

As one non-limiting example, the lower pressure injector may inject the first substance including at least ethanol and the higher pressure injector may inject the second substance including at least gasoline or a mixture of gasoline and ethanol, whereby the first substance has a greater concentration of ethanol than the second substance. As another example, the lower pressure direct injector can deliver the second substance including at least gasoline or a mixture of gasoline and ethanol and the higher pressure direct injector can deliver the first substance including at least ethanol of a higher concentration than the second substance.

As yet another example, the lower pressure injector may inject the first substance and the higher pressure injector may inject the second substance, whereby the first substance has a higher or lower octane rating than the second substance.

Figure 9A:
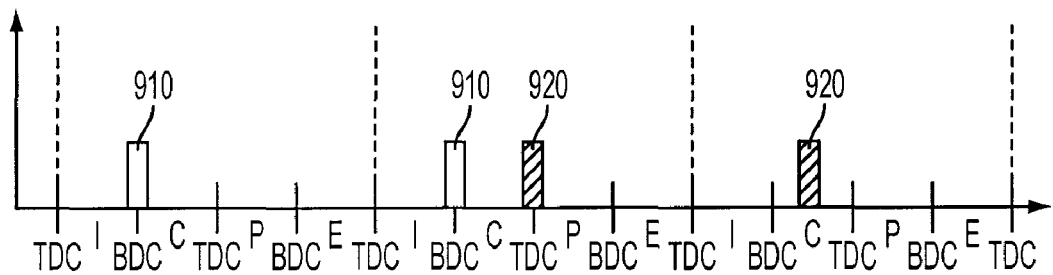
FIGS. 9A-9G show timing diagrams depicting example injection strategies that may be used with the example engine systems and control methods described herein.

As shown by FIG. 9A, during some conditions, only the lower pressure direct injector may be operated to deliver the first substance to the combustion chamber as indicated at 910 by the first example cycle. During other conditions, both the lower pressure direct injector and the higher pressure direct injector may be operated to respectively deliver the first substance at 910 and the second substance at 920 to the combustion chamber as indicated by the second example cycle. During other conditions, only the higher pressure direct injector may be operated to deliver the second substance at 920 to the combustion chamber as indicated by the third example cycle. For example, during SI operation, a fuel including at least gasoline may be provided to the engine via the higher pressure direct injector during conditions where the engine is not knock limited, while during conditions where the engine is knock limited, the lower pressure injector may also be operated to provide a knock suppressing substance such as ethanol to the combustion chamber in addition to the fuel provided by the higher pressure injector.

Figure 9B:
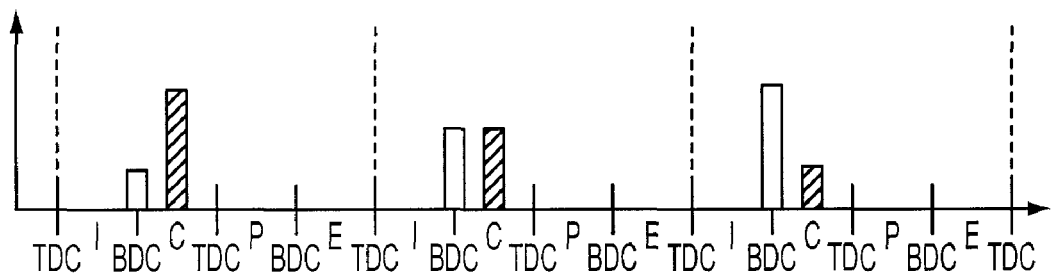

As shown by FIG. 9B, the amount of a first substance provided to the combustion chamber via the lower pressure direct injector may be increased relative to the amount of a second substance provided to the combustion chamber via the higher pressure direct injector over one or more cycles. Further, FIG. 9B shows how during some conditions, the absolute amount of the first substance delivered to the combustion chamber by the lower pressure direct injector may be less than, equal to, or greater than the absolute amount of the second substance delivered to the combustion chamber by the higher pressure direct injector.

For example, as shown by FIG. 9B, the amount of a knock suppressing substance such as ethanol that is delivered to the combustion chamber by the lower pressure injector may be increased over one or more cycles relative to the amount of a fuel substance such as gasoline that is delivered to the combustion chamber by the higher pressure injector. This approach may be used, for example, to increase charge cooling so that during SI combustion the likelihood, occurrence, or intensity of engine knock is reduced, or may be used to retard auto-ignition timing during CAI combustion.

Figure 9C:
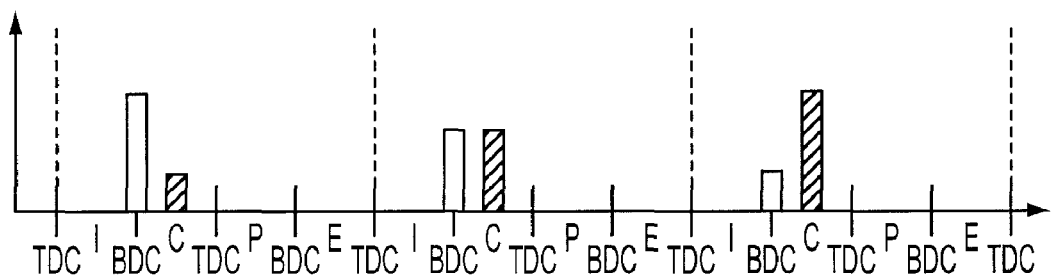

For example, as shown by FIG. 9C, the amount of a knock suppressing substance such as ethanol that is delivered to the combustion chamber by the lower pressure injector may be reduced over one or more cycles relative to the amount of a fuel substance such as gasoline that is delivered to the combustion chamber by the higher pressure injector. This approach may be used, for example, to decrease charge cooling so that during SI combustion the likelihood, occurrence, or intensity of engine knock is reduced, or may be used to advance auto-ignition timing during CAI combustion.

Figure 9D:
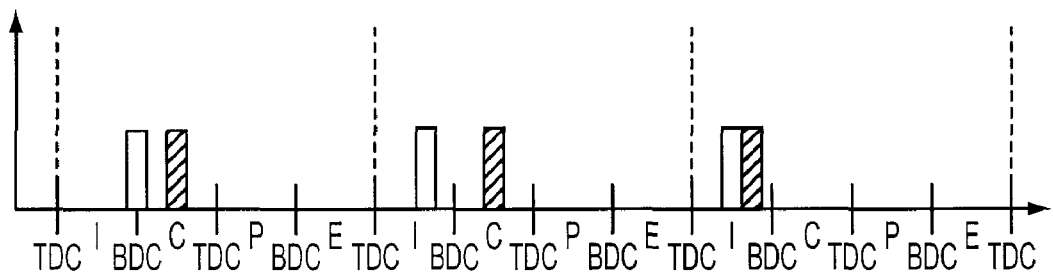

FIG. 9D shows how the timing of delivery of the first and/or second substances may be advanced over one or more engine cycles. Further, FIG. 9D shows how the timing delay between the injections may be increased or decreased between cycles. The timing of delivery of the first and/or second substance as well as the timing delay between the delivery of the first and the second substances can be varied to control the timing of auto-ignition during CAI combustion and/or the amount of knock suppression provided during SI combustion.

Figure 9E:
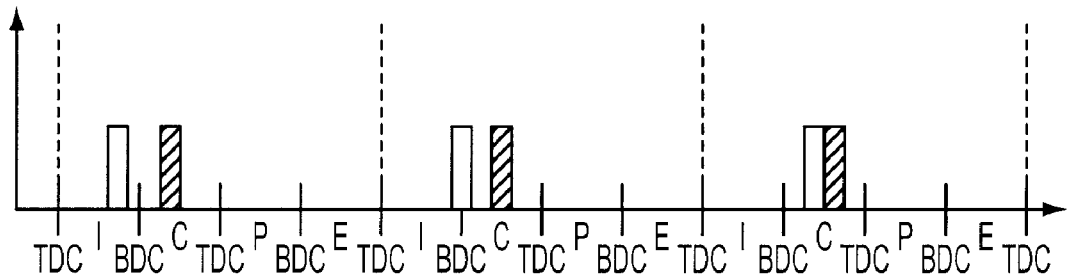

FIG. 9E shows how the timing of delivery of the first and/or second substances may be retarded over one or more engine cycles. Further, FIG. 9E shows how the timing delay between the injections may be increased or decreased between cycles. The timing of delivery of the first and/or second substance as well as the timing delay between the delivery of the first and the second substances can be varied to control the timing of auto-ignition during CAI combustion and/or the amount of knock suppression provided during SI combustion.

Figure 9F:
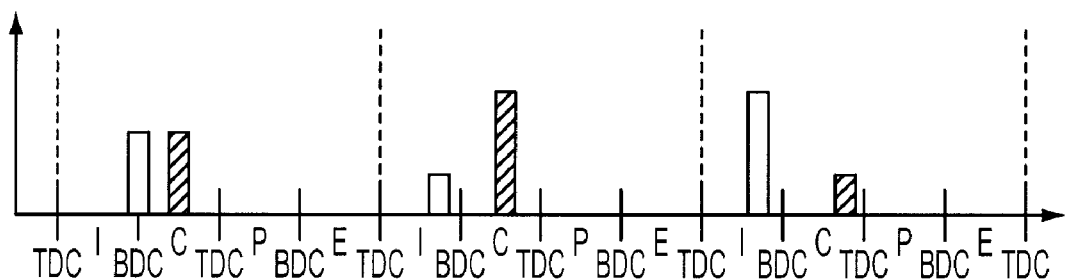

FIG. 9F shows how the relative amounts of the first and second substances, the absolute amounts of the first and second substances, the timing of delivery of the first substance and the second substances, and the relative delay between the injections can be varied to control auto-ignition timing during CAI mode and provide knock suppression during SI mode.

Figure 9G:
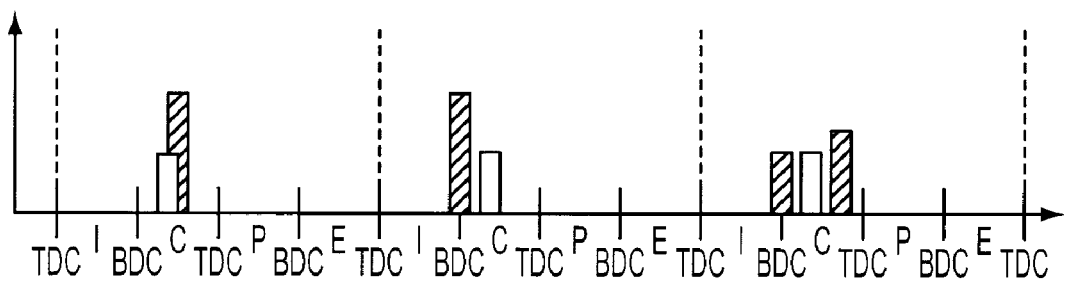

FIG. 9G shows how during some conditions, the injections provided by the injectors can at least partially overlap in time as indicated by the first cycle. As indicated by the second cycle, the higher pressure injector can provide a substance to the cylinder before the lower pressure injector. As indicated by the third cycle, the higher pressure injector can provide a plurality of injections of a substance into the cylinder both before and/or after the lower pressure injection.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. An engine system for a vehicle, comprising:
   a combustion chamber including a piston;
   a boosting device including at least a compressor fluidly coupled to the combustion chamber via an intake passage;
   a higher pressure fuel system configured to deliver a first fuel including at least gasoline to the combustion chamber via a first in-cylinder direct injector;

a lower pressure fuel system configured to deliver a second fuel including at least alcohol to the combustion chamber via a second in-cylinder direct injector; and a control system configured to vary relative amounts of the first fuel and the second fuel delivered to the combustion chamber responsive to an operating condition.

2. The engine system of claim 1, wherein the higher pressure fuel system includes a first lower pressure fuel pump and a second higher pressure fuel pump arranged in series and wherein the lower pressure fuel system includes a single fuel pump.

3. The engine system of claim 1, wherein the higher pressure fuel system provides the first fuel to the first injector via a first lower pressure fuel pump and a second higher pressure fuel pump and wherein the lower pressure fuel system provides the second fuel to the second injector via the first lower pressure fuel pump.

4. The engine system of claim 1, further comprising a spark plug and wherein the control system is configured to initiate combustion of the first and second fuels within the combustion chamber via an ignition spark performed by the spark plug; wherein the operating condition includes engine load; and wherein the amount of the second fuel injected into the combustion chamber is increased relative to the amount of the first fuel with increasing engine load.

5. The engine system of claim 1, wherein the control system is configured to initiate auto-ignition of the first and second fuels within the combustion chamber via compression performed by the piston; and wherein the operating condition includes a timing of the auto-ignition of the first and second fuels.

6. An engine system for a vehicle, comprising:
a combustion chamber;
a first in-cylinder direct injector configured to deliver a first substance including at least gasoline directly to the combustion chamber at a first pressure; and
a second in-cylinder direct injector configured to deliver a second substance including at least an alcohol directly to the combustion chamber at a second pressure less than the first pressure.

7. The engine system of claim 1, wherein the alcohol includes ethanol.

8. The engine system of claim 1, wherein the second substance includes a greater concentration of the alcohol than the first substance.

9. The engine system of claim 8, further comprising a control system configured to vary the relative amounts of the first substance and the second substance delivered to the combustion chamber responsive to an operating condition.

10. The engine system of claim 9, wherein the operating condition includes engine load.

11. The engine system of claim 9, wherein the operating condition includes a combustion mode performed by the combustion chamber.

12. The engine system of claim 11, wherein the control system is further configured to vary the combustion mode performed by the combustion chamber between a spark ignition mode and an auto-ignition mode.

13. The engine system of claim 6, wherein the second pressure is within the range of 20 bar to 35 bar and the first pressure is within the range of 35 bar to 150 bar.

14. A method of operating an internal combustion engine including at least one combustion chamber, comprising:
during each of a plurality of cycles of the combustion chamber:
injecting a first substance including at least gasoline directly into the combustion chamber at a first pressure via a first in-cylinder direct injector;
injecting a second substance including at least an alcohol directly into the combustion chamber at a second pressure less than the first pressure via a second in-cylinder direct injector; and
initiating combustion of a mixture of air and the first and the second injected substances within the combustion chamber.

15. The method of claim 14, wherein the second pressure is substantially less than the first pressure.

16. The method of claim 15, wherein the second substance includes a greater concentration of the alcohol than the first substance and where at least some of the second substance is delivered to the combustion chamber before the first substance is delivered to the combustion chamber.

17. The method of claim 14, wherein said combustion of the mixture is initiated by an ignition spark performed by a sparking device; and wherein the method further comprises, during each of the plurality of cycles of the combustion chamber, adjusting relative amounts of the first and second substance that are injected into the combustion chamber responsive to at least one of engine load, engine speed, and an indication of engine knock.

18. The method of claim 14, wherein said combustion of the mixture is initiated by compression performed by a piston of the combustion chamber to achieve auto-ignition of the mixture; and wherein the method further comprises, during each of the plurality of cycles of the combustion chamber, adjusting relative amounts of the first and second substance that are injected into the combustion chamber responsive to a timing of the auto-ignition of the mixture.

19. The method of claim 18, wherein said mixture forms a substantially homogeneous mixture within the combustion chamber before combustion.

20. The method of claim 14, wherein during a first portion of the plurality of cycles, combustion of the mixture is initiated by an ignition spark performed by a spark plug; and during a second portion of the plurality of cycles, the mixture is combusted by auto-ignition via compression performed by a piston of the combustion chamber; and wherein the method further comprises, during the second portion of the plurality of cycles, varying an amount of the second substance injected into the combustion chamber relative to an amount of the first substance injected into the combustion chamber responsive to a timing of the auto-ignition of the mixture.

* * * * *